July 10, 1951　　　F. W. KESSLER　　　2,560,177
FLUSH PIN GAUGE
Filed Aug. 5, 1949
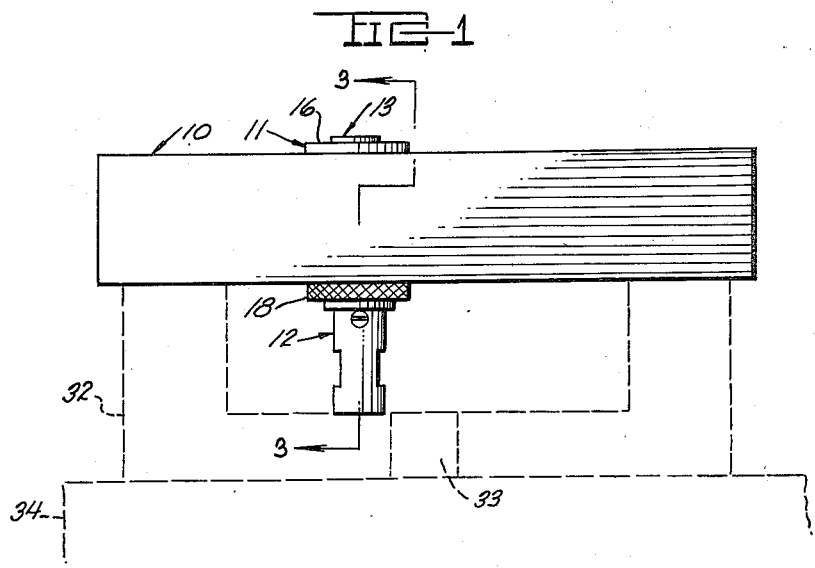
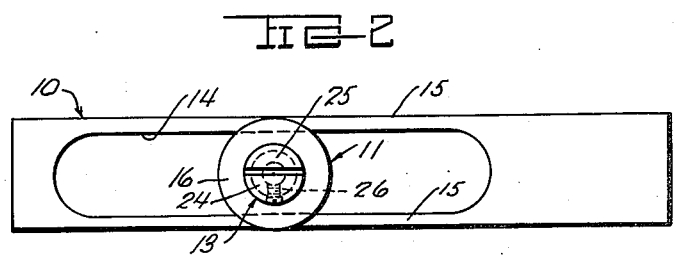
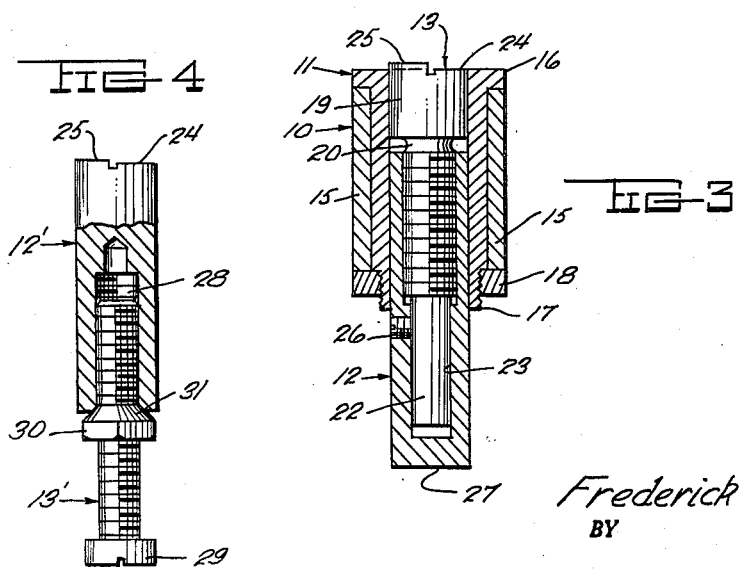
INVENTOR.
Frederick W. Kessler
BY
McMorrow, Berman & Davidson
ATTORNEYS Patented July 10, 1951

2,560,177

UNITED STATES PATENT OFFICE 2,560,177

FLUSH PIN GAUGE

Frederick W. Kessler, Springfield, Mass.

Application August 5, 1949, Serial No. 108,794

2 Claims. (Cl. 33—169)

This invention relates to depth-measuring gauges, and more particularly to an adjustable, flush pin gauge for measuring the depth of cavities, holes and counterbores provided in work pieces by machining operations, and the total length or height of hollow work pieces, such as bushings, sleeves and similar structures.

It is among the objects of the invention to provide an improved flush pin gauge of simplified construction which will accurately measure the depth of holes, counterbores and cavities in work pieces, and the length of bores and apertures in hollow work pieces, and definitely indicate whether the dimensions measured are within the prescribed working tolerances, which is adjustable within extremely wide limits to measure cavities or depressions of different depths and the total length or height of hollow work pieces of different dimensions, which is easy to adjust and use, and in which the tolerance indication is clearly visible, and which is economical in construction and can be readily provided in sets of gauges of different sizes for different weight classes of work pieces.

Other objects and advantages will become apparent from a consideration of the following description and the appended claims in conjunction with the accompanying drawing, wherein:

Figure 1 is a side elevation of a flush pin gauge assembly illustrative of the invention;

Figure 2 is a top plan view of the flush pin gauge assembly illustrated in Figure 1;

Figure 3 is a transverse cross-section on the line 3—3 of Figure 1; and

Figure 4 is a longitudinal cross-sectional view of a somewhat modified form of plug and pin sub-assembly for the gauge assembly.

With continued reference to the drawing, the flush pin gauge assembly of the present invention comprises, in general, an elongated gauge bar 10 having a sleeve-receiving hole therethrough substantially at its mid-length location, a sleeve 11 received in the hole provided in the gauge bar, a hollow, internally screw-threaded plug 12 slidable in the sleeve, and a screw-threaded pin 13 threaded into the hollow plug, the plug and pin components of the plug and pin sub-assembly in the somewhat modified arrangement, shown in Figure 4, being indicated by the reference numerals 12' and 13'.

The bar 10 is an elongated body of suitable material, such as tool steel, and is preferably of rectangular cross-section with four flat sides, the opposite sides being substantially parallel to each other, and the top and bottom sides of the bar are absolutely straight within the limitations of the most exact manufacturing methods. This bar has a hole in the form of an elongated slot 14 extending therethrough between its top and bottom sides, and from a location adjacent one end of the bar to a location beyond the mid-length location of the bar from said one end. The width of the slot is such as to leave, at its opposite sides, opposed side walls 15 having a thickness sufficient to insure absolute rigidity of the bar while in use. The ends of the slot 14 are arcuately rounded, as particularly illustrated in Figure 2, and the hollow, cylindrical sleeve 11 is received in, and extends through the slot 14 in the bar. At its end adjacent the upper side of the bar, the sleeve 11 is provided with an outwardly-extending, external flange 16 which rests upon the upper edges of the side walls 15 at the opposite sides of the slot 14; and at its opposite or lower end, this sleeve is provided with an externally screw-threaded portion 17. A nut 18 is threaded upon the screw-threaded portion 17 of the sleeve and bears against the bottom edges of the side walls 15 to firmly clamp the sleeve in adjusted position lengthwise of the slot 14.

The hollow, internally screw-threaded plug 12 is slidably received in the sleeve 11, and has an external diameter substantially equal to the internal diameter of the sleeve.

The screw-threaded plug 12 has a cylindrical head 19 with an outside diameter substantially equal to the inside diameter of the sleeve 11, which head is joined by a reduced neck 20 to an externally screw-threaded portion 21 which is threaded into the internally screw-threaded bore of the hollow plug 12. At the end of the screw-threaded portion 21 of the pin opposite the head 19, a reduced, cylindrical portion 22 of the pin extends into a reduced portion 23 of the bore of the plug, the extension 22 of the pin and the reduced extension 23 of the plug bore being smooth and without screw threads.

The distance from the neck 20 of the pin to the outer end of the reduced extension 22 of the latter is slightly less than the length of the bore in the plug 12, so that the pin can be threaded fully into the bore of the plug and can be threaded outwardly of the plug bore to adjustably vary the length of the pin and plug assembly.

The plug and pin assembly has, at its end adjacent the flanged end of the sleeve 11, two surfaces 24 and 25, each of which has an area substantially equal to one-half the area of the bore of the sleeve 11, and both of which are disposed substantially perpendicular to the longitudinal center-line of the pin and plug assembly. These two surfaces 24 and 25 are spaced apart longitudinally of the longitudinal center-line of the pin and plug assembly a distance substantially equal to the prescribed working tolerance of the work which the gauge is used to measure.

In the form of the device illustrated in Figure 3, the pin is locked in adjusted position relative to the plug by suitable means, such as the set screw 26 which is threaded through a screw-threaded aperture provided in the wall of the plug and bears at its inner end against the reduced extension 22 of the pin.

The pin and plug assembly has, at its end opposite the gauge surfaces 24 and 25, a plane, work or table-contacting surface 27 which is also preferably disposed perpendicular to the longitudinal center-line of the assembly, but this work-contacting surface may be rounded or otherwise shaped for special measuring operations, if found necessary or desirable.

In the somewhat modified plug and pin assembly illustrated in Figure 4, the gauge surfaces 24 and 25 are provided on one end of the cylindrical plug 12', which plug is provided with an internally screw-threaded bore 28 opening to the end of the plug opposite the gauge surfaces. The pin 13', in this case, is an externally screw-threaded screw or bolt having, at one end, a flat head 29. The pin 13' is threaded into the bore 28 of the plug 12', and a lock nut 30 threaded onto the pin bears against the end of the plug at which the bore 28 opens, to lock the pin in adjusted position relative to the plug. This lock nut 30 preferably has a conical face 31 facing the plug, and the plug is chamfered around the end of the bore 28 to provide a seat for this conical face of the lock nut.

In use, the pin and plug assembly is adjusted by means of a suitable master gauge or micrometer to the length desired. This length is the desired depth of the cavity in the work piece, or the desired height of a hollow work piece plus the width of the gauge block 10, which width is an exactly even dimension, so that it can be easily added to the desired work piece dimension to determine the total length of the pin and plug assembly. For example, the width of the gauge block may be exactly one inch, exactly one centimeter, or any multiple or even fraction of such units of measurements, such as one-half-an-inch or two centimeters.

In Figure 1 the gauge assembly is diagrammatically illustrated to measure the depth of a cavity in a hollow work piece 32. In order to accomplish this the sleeve 11 is set at a predetermined position longitudinally of the slot 14 in the gauge or block 10, the pin and plug assembly is adjusted to the proper length and, with the bottom side of the gauge bar resting on the top of the work piece, the bottom end of the pin and plug assembly is brought into contact with the bottom of the cavity in the work piece. If the surface of the flanged end of the sleeve 11 is now between the surfaces 24 and 25 of the pin and plug assembly, the depth of the cavity is within the prescribed working tolerances.

In order to measure the total height of such a hollow work piece, the sleeve may be moved longitudinally of the slot to bring the pin and plug assembly in registry with an aperture 33 in the work piece and, with the pin and plug assembly adjusted to the proper length to measure the proper height of the work piece and with the work piece resting upon a flat-topped support or table 34, the lower portion of the pin and plug assembly is lowered through the aperture 33 in the work piece to the surface of the table and it is then determined whether the end surface at the flanged end of the sleeve 11 is between the gauge surfaces 24 and 25.

The pin and plug assemblies, as illustrated in Figures 3 and 4, operate in the same manner in the gauge assembly, the pin and plug sub-assembly illustrated in Figure 3 being somewhat easier to adjust in length, while the modified sub-assembly illustrated in Figure 4 is somewhat more economical to manufacture.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A flush pin gauge comprising a gauge bar provided with a longitudinally extending slot intermediate its ends, a sleeve extending through said slot and having one end secured to said bar, a cylindrical plug having a bore open at one end and closed at the other end slidably received within said sleeve, the bore of said plug having internal threads inwardly from its open end and terminating at a point spaced from its closed end, the threads extending radially with respect to the axis of said bore, a pin having one end extending into the open end of said bore with its other end positioned adjacent to and spaced from said open end thereof, said pin having external threads intermediate its ends to thereby form an intermediate threaded portion in threaded engagement with said internal threads on said bore, and a head arranged adjacent the other end of said pin and having one end secured to the other end of said pin, the other end of said head being provided with two stepped surfaces spaced apart longitudinally of the longitudinal center line of said pin.

2. A flush pin gauge comprising a gauge bar provided with a longitudinally extending slot intermediate its ends, a sleeve extending through said slot and having one end secured to said bar, a cylindrical plug having a bore open at one end and closed at the other end slidably received within said sleeve, the bore of said plug having internal threads inwardly from its open end and terminating at a point spaced from its closed end, the threads extending radially with respect to the axis of said bore, a pin having one end extending into the open end of said bore with its other end positioned adjacent to and spaced from said open end thereof, said pin having external threads intermediate its ends to thereby form an intermediate threaded portion in threaded engagement with said internal threads on said bore, a head arranged adjacent the other end of said pin and having one end secured to the other end of said pin, the other end of said head being provided with two stepped surfaces longitudinally of the longitudinal center line of said pin, and a transversely disposed screw threaded into said plug intermediate the ends thereof and engageable with said pin to lock said pin in an adjusted position relative to said plug.

FREDERICK W. KESSLER.

REFERENCES CITED

The following references are of record in the file of this patent:

UNITED STATES PATENTS

| Number | Name | Date |
| --- | --- | --- |
| 923,880 | Nielsen | June 8, 1909 |
| 1,216,879 | Stuppillo | Feb. 20, 1917 |
| 2,165,881 | Bennett | July 11, 1939 |
| 2,363,165 | Vierling | Nov. 21, 1944 |